UNITED STATES PATENT OFFICE.

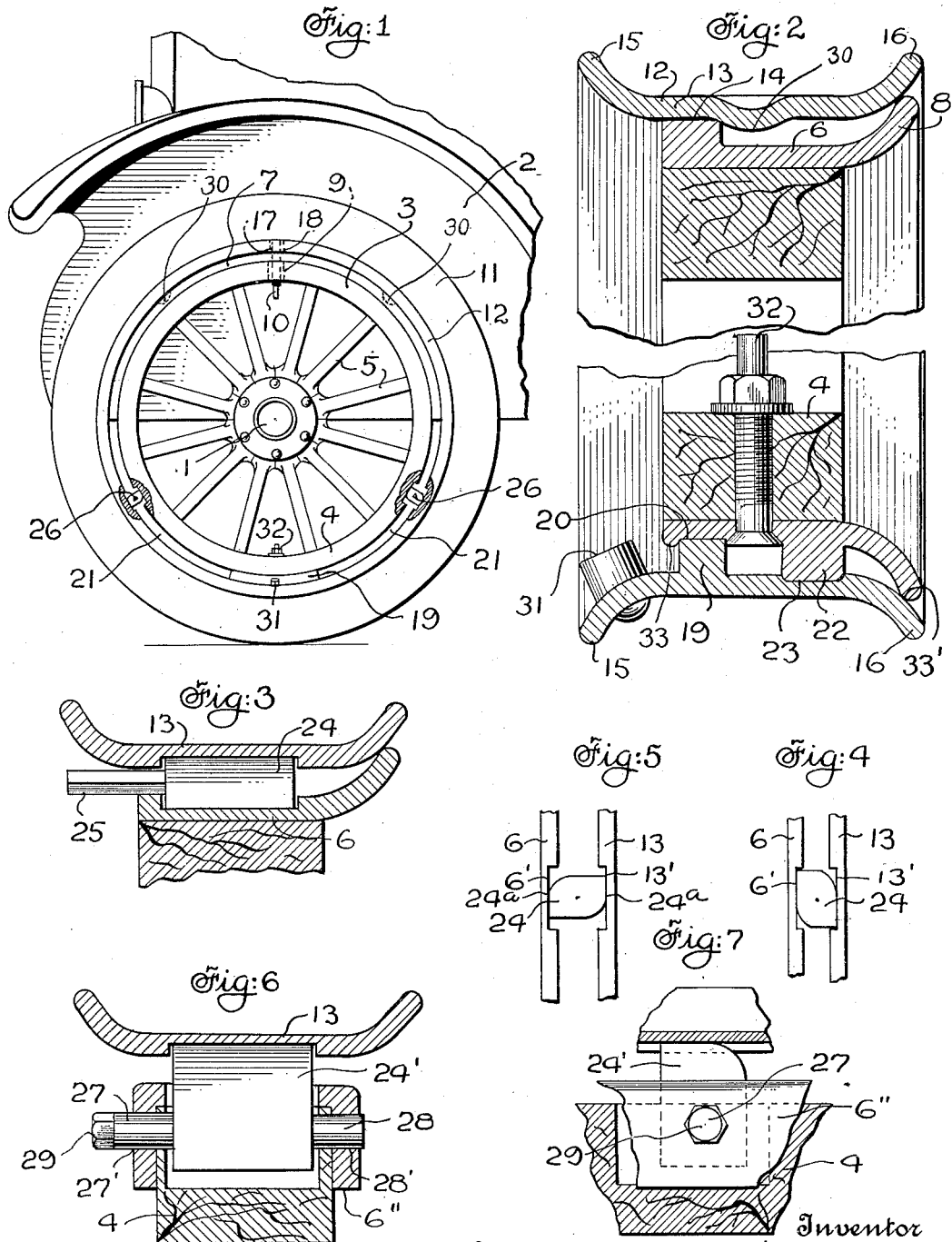

CHARLES F. RUBSAM, OF CLEVELAND, OHIO.

VEHICLE-WHEEL.

1,395,363.  Specification of Letters Patent.  Patented Nov. 1, 1921.

Application filed April 17, 1918, Serial No. 229,069. Renewed March 19, 1921. Serial No. 453,719.

*To all whom it may concern:*

Be it known that I, CHARLES FERDINAND RUBSAM, a citizen of the Republic of France, and a resident of Cleveland, county of Cuyahoga, and State of Ohio, have invented an Improvement in Vehicle-Wheels, of which the following is a specification.

My invention relates to vehicle wheels, and more particularly to those types of vehicle wheels which are provided with removable or detachable tire-carrying rims, rendering such wheels particularly useful in connection with road vehicles, such as automobiles and the like. The object of the present invention is to improve the construction of wheels of the general character indicated so as to render the same more simple to manufacture and more efficient in operation.

By way of example, I have illustrated several preferred embodiments of my invention in the accompanying drawings wherein;

Figure 1 is a side elevational view of one such embodiment;

Fig. 2 is a fragmentary cross-sectional view of the same on an enlarged scale, showing the rim in position on the wheel body;

Fig. 3 is a cross-sectional detail view on an enlarged scale of a part of the wheel structure;

Figs. 4 and 5 are diagrammatic views showing one form of locking member in inoperative and operative positions, respectively;

Fig. 6 is a detail cross-sectional view of another form of locking member, and Fig. 7 a side elevational view of the same.

Referring to the illustrative embodiments herein shown and described by way of example merely, 1 indicates an axle of a vehicle 2, such as an automobile or the like, said axle carrying in the usual manner a wheel body 3 consisting, for example, of a felly 4, spokes 5, and a felly band 6 attached to the outer face of the felly 4. The felly band 6 is provided with a preferably substantially cylindrical bearing portion or surface 7 and the flange member or portion 8. The felly is provided in the usual manner with a radial aperture 9 for permitting the passage of a tire valve 10 of a tire 11 therethrough.

Coöperating with the wheel body 3 is a removable or detachable rim 12 comprising, preferably, a rim band 13 providing on the inner surface thereof a preferably substantially cylindrical bearing surface 14. The rim band 13 is also preferably provided with a plurality of up-turned flanged members 15 and 16 for retaining the tire 11 in place on the rim. The rim band 13 is provided in the usual manner with an aperture 17 for permitting the passage of the tire valve 10 therethrough, said aperture 17 being preferably, though not necessarily, provided with a reinforcing thimble 18.

In its preferred form, the vehicle wheel of my invention is provided with a plurality of coöperating bearing surfaces, preferably in the form of substantially cylindrical surfaces, the relative diametric dimensions of the wheel body and rim being so proportioned that the rim will either be loose on the wheel body when first applied thereto, or will just barely fit the wheel body without requiring to be forced into position on the wheel body, or will be smaller than the felly so as to require the rim to be expanded at certain portions thereof in order to position the rim on the wheel body. The coöperating substantially cylindrical bearing surfaces of the rim and wheel body are preferably so disposed that one or more portions of the opposed faces of the wheel body and rim, when the rim is in position on the wheel body, will be substantially out of contact with each other. In order to properly position and secure the rim on the wheel body, I provide means adjacent said non-contacting portion or portions to expand the rim at such portions to thereby cause the rim to become contracted along those portions of the same which are provided with the bearing surfaces, to thereby cause the rim to tightly engage the wheel body. As a result of this arrangement, the rim will be more or less flexed adjacent the non-contacting portions of the rim and wheel body to cause the rim to accommodate itself to wheel bodies of slightly varying dimensions. Furthermore, I may provide a rim which is loosely applicable to the wheel body, the necessary engagement of the rim and wheel body being obtained by means now to be described.

I accomplish these results by providing the rim and wheel body with a plurality of coöperating, preferably substantially cylindrical bearing surfaces, as for example, by providing the rim, or wheel body, or both, with one or more raised cylindrical bearing members or portions. In the form illustrated, the felly band 6 is provided with a raised bearing surface or member 7 along substantially 180° more or less, of its circumference, said bearing member 7 coöperating with the substantially cylindrical bearing surface 14 of the rim band 13. Adjacent another portion of the wheel I provide the rim band 13 with a raised bearing member or portion 19 which preferably coöperates with a substantially cylindrical groove 20 in the wheel body 4. While the bearing member 7 may be 180°, more or less, in extent, I prefer to employ a comparatively short member 19 so as to provide the bridge or non-contacting portions 21, 21, as shown in Fig. 1. I may also provide the rim, or wheel body, or both, here shown as the wheel body 4, with the raised, comparatively short bearing member or support 22, preferably of cylindrical form coöperating with a substantially cylindrical groove or depression 23, as more clearly shown in Fig. 2.

As already stated, the relative sizes of rim and wheel body may be such that the rim has either a loose fit on the body, or just fits the same, or has an internal diameter at certain portions thereof smaller than the corresponding external diameter of the wheel body, thereby necessitating the application of pressure to force the rim into position on the body. Where the rim initially fits comparatively loosely on the wheel body, I prefer to employ the means illustrated for expanding the rim adjacent the bridge or non-contacting portions of the wheel to thereby contract the same adjacent the bearing surfaces to thereby cause the rim to tightly engage the wheel body. Or, if the rim just fits the wheel body or is smaller than the same so as to require that the rim be sprung into position on the body, the locking means may serve to cause the rim to more tightly engage the body by expanding the rim adjacent the non-contacting portions to thereby cause the same to contract along the bearing surfaces.

While various forms of locking and expanding members, such as clamps, may be employed, I prefer to employ a member of the general character illustrated in Figs. 1, 3, 4 and 5, wherein is shown a rotatable locking member 24 which is disposed between the felly band 6 and the rim band 13 as shown in Fig. 4 said locking member 24 normally lying within the depressions 6' and 13' of the felly and rim bands respectively. The locking member 24, of which one or more may be employed, has one transverse dimension thereof substantially smaller than another transverse dimension thereof, and provides a plurality of bearing surfaces 24ª. Accordingly, when the member 24 is rotated through a quarter turn from its inoperative position as shown in Fig. 4 into its operative position as shown in Fig. 5, the felly and rim bands 6 and 13 respectively will be separated adjacent the bridge portions 21 to thereby expand the rim band 13 adjacent such bridge portions. This causes the rim to tend to become contracted along those portions of the same which are in contact with the bearing surfaces provided on the wheel body 4. Each member 24 may be operated by means of any suitable tool 25, a socket 26 being provided in one or both ends of member 24 to facilitate engagement with tool 25.

In Fig. 6 I have shown another form of locking and expansion member, said member comprising a rotatable eccentric member 24' substantially similar in form to member 24. Member 24' is provided with the pivots 27 and 28, said pivots being rotatably borne in the apertures 27' and 28' respectively of the felly band 6''. In this case the tool 29 engages the outer end of one of the pivots 27 to operate said member 24' into and out of operative locking position.

The use of the vehicle wheel of my invention will be substantially clear from the foregoing description. In applying the rim to the wheel body, the rim is so presented to the wheel body as to permit the tire valve 10 to pass through aperture 9 of the felly 3 and through aperture 17 of rim band 13. In order to further securely position the rim against transverse displacement along the wheel body during the act of applying the rim to the wheel body, I may provide one or more protruding portions 30 along the inner face of the rim band 13 coöperating with bearing member 7 to help position the rim on the wheel body during the application of the former to the latter. Where, for example, the rim is internally smaller at certain portions thereof than the corresponding external portions of the wheel body, the rim will have to be forced or sprung into position on the wheel body. For this purpose I provide a projection 31 on the flange portion 15 of the rim band 13. I also provide a bolt 32 or similar member on the inner face of the felly 4. By means of any suitable tool coöperating with portions 31 and 32, the rim may be sprung into position on the wheel body by forcing member 19 past edge 33, defining groove 20, and so into said groove. At the same time member 22 will be forced into groove 23. If the relative sizes of the rim and wheel body are properly chosen, no further means may be necessary for properly positioning the rim on the wheel body. I prefer however, especially in the case of wheels for large vehicles of heavy draft to provide the locking means illustrated, said means serving to expand the rim adjacent the bridge or non-contacting portions of the same to thereby contract the rim adjacent the bearing surfaces. In those cases where the rim is internally larger than or of the same size as the corresponding external dimensions of the wheel body, the locking and expanding members serve also to fixedly position the rim on the wheel body. It will also be seen that an additional, substantially continuous bearing edge or surface between the rim and body is provided at 33' by the coöperation of flange 8 and portion 16 of rim band 13. Where the flange 8 and grooves 20 and 23 are omitted, any suitable means, such as a short, raised member along any part of the rim band 13 may be employed to limit the inward pivotal movement of the rim during its application to the wheel body. Parts 30 may comprise a single, continuous band or protruding member for the purpose specified. Grooves 20 and 23 may, of course, be omitted. In connection with Fig. 2 it may be stated that the raised bearing members 19 and 22 and their respective grooves 20 and 23 are so proportioned and arranged that as the rim is applied to the felly, member 22 acts to somewhat expand the rim, the final expansion of the same being brought about by member 19. This arrangement, which is preferably provided where the rim is smaller than or just fits the felly, renders the application of the rim more easy and convenient.

It is of course to be understood that my invention is not to be limited to the specific embodiments herein shown and described by way of example merely.

I claim as my invention:

1. A vehicle wheel comprising a wheel body having a flange at the vehicle side, a removable rim for said wheel body, means associated with said rim and said wheel body for permitting the former to be swung into position on the latter about a portion of the wheel body as a pivot, said means comprising a plurality of raised, segmental bearing members interposed between said rim and wheel body, said bearing members being spaced from each other, certain of said bearing members being included entirely within one and the remainder of the said bearing members being included entirely within the other of two complementary arcs of about 180° each, one of said arcs including that portion of the wheel body about which the rim is swung as a pivot, the bearing member on one of said arcs being nearer to one side and the bearing member on the other of said arcs being nearer to the other side of the wheel, and clamping means intermediate certain of said bearing members for clamping the rim in position on the wheel body.

2. A vehicle wheel comprising a wheel body having a flange at the vehicle side, a removable rim for said wheel body, means associated with said rim and said wheel body for permitting the former to be swung into position on the latter about a portion of the wheel body as a pivot, said means comprising a plurality of raised, substantially cylindrical segmental bearing members interposed between said rim and wheel body, said bearing members being spaced from each other, certain of said bearing members being included entirely within one and the remainder of the said bearing members being included entirely within the other of two complementary arcs of about 180° each, one of said arcs including that portion of the wheel body about which the rim is swung as a pivot, the bearing member on one of said arcs being nearer to one side and the bearing member on the other of said arcs being nearer to the other side of the wheel, and clamping means intermediate certain of said bearing members for clamping the rim in position on the wheel body.

3. A vehicle wheel comprising a wheel body having a flange at the vehicle side, a removable rim for said wheel body, means associated with said rim and said wheel body for permitting the former to be swung into position on the latter about a portion of the wheel body as a pivot, said means comprising a plurality of raised segmental bearing members interposed between said rim and wheel body, said bearing members being spaced from each other, certain of said bearing members being included entirely within one and the remainder of the said bearing members being included entirely within the other of two complementary arcs of about 180° each, one of said arcs including that portion of the wheel body about which the rim is swung as a pivot, the bearing member to one of said arcs being nearer to one side and the bearing member on the other of said arcs being nearer to the other side of the wheel, and clamping means providing additional bearing means intermediate certain of said bearing members for clamping the rim in position on the wheel body.

4. A vehicle wheel comprising a wheel body having a flange at the vehicle side, a removable rim for said wheel body, means associated with said rim and said wheel body for permitting the former to be swung into position on the latter about a portion of the wheel body as a pivot, said means comprising a plurality of raised, substantially cylindrical segmental bearing members interposed between said rim and wheel body, said bearing members being spaced from each other, certain of said bearing members being included entirely within one and the remainder of the said bearing members being included entirely within the other of two complementary arcs of about 180° each, one of said arcs including that portion of the wheel body about which the rim is swung as a pivot, the bearing member on one of said arcs being nearer to one side and the bearing member on the other of said arcs being nearer to the other side of the wheel, and clamping means providing additional bearing means intermediate certain of said bearing members for clamping the rim in position on the wheel body.

In testimony whereof, I have signed my name to this specification this 12th day of April, 1918.

CHARLES F. RUBSAM.